US009961149B2

(12) United States Patent
Poletto et al.

(10) Patent No.: US 9,961,149 B2
(45) Date of Patent: *May 1, 2018

(54) SYSTEMS AND METHODS FOR MAINTAINING LOCAL VIRTUAL STATES PENDING SERVER-SIDE STORAGE ACROSS MULTIPLE DEVICES AND USERS AND INTERMITTENT NETWORK CONNECTIONS

(71) Applicant: DROPBOX, INC., San Francisco, CA (US)

(72) Inventors: Stephen Poletto, San Francisco, CA (US); Nils Peter Welinder, San Francisco, CA (US); Anthony Grue, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/335,161

(22) Filed: Oct. 26, 2016

(65) Prior Publication Data

US 2017/0048332 A1 Feb. 16, 2017

Related U.S. Application Data

(63) Continuation of application No. 14/247,528, filed on Apr. 8, 2014, now Pat. No. 9,544,373.

(Continued)

(51) Int. Cl.
*H04L 29/08* (2006.01)
*H04L 29/06* (2006.01)
(Continued)

(52) U.S. Cl.
CPC ........ *H04L 67/142* (2013.01); *G06F 12/1072* (2013.01); *G06F 17/3028* (2013.01);
(Continued)

(58) Field of Classification Search
CPC ..... H04L 67/06; H04L 67/16; G06F 12/1072; G06F 11/2082
See application file for complete search history.

(56) References Cited

U.S. PATENT DOCUMENTS 5,581,765 A * 12/1996 Munroe ................. G06F 9/465
711/E12.014
6,343,313 B1 1/2002 Salesky et al.
(Continued)

FOREIGN PATENT DOCUMENTS

EP 1422901 5/2004
EP 3087486 11/2016
(Continued)

OTHER PUBLICATIONS

U.S. Appl. No. 14/247,607, Apr. 4, 2017, Office Action.
(Continued)

*Primary Examiner* — Chirag R Patel
(74) *Attorney, Agent, or Firm* — Keller Jolley Preece

(57) ABSTRACT

Systems, methods, and non-transitory computer readable media are provided for maintaining local virtual states pending server-side storage across multiple devices and users and intermittent network connections. In exemplary embodiments, content added by a user to his or her account locally on a user device may be displayed, and all interactivity therewith may be facilitated, as if the content had already been created on the content management system. In content management system applications that support shared virtual spaces, changes made by the user from his or her user device to the shared virtual space (including creation of a new shared virtual space) may be displayed locally as soon as the change has been made, not waiting for the information to be transmitted to the server or its state to be made consistent with that of the mobile device.

20 Claims, 7 Drawing Sheets

Related U.S. Application Data

(60) Provisional application No. 61/920,730, filed on Dec. 24, 2013, provisional application No. 61/945,816, filed on Feb. 27, 2014, provisional application No. 61/945,814, filed on Feb. 27, 2014.

(51) Int. Cl.
*G06F 17/30* (2006.01)
*H04W 76/02* (2009.01)
*G06F 12/1072* (2016.01)
*H04L 12/26* (2006.01)

(52) U.S. Cl.
CPC .. *G06F 17/30165* (2013.01); *G06F 17/30575* (2013.01); *G06F 17/30943* (2013.01); *H04L 43/0811* (2013.01); *H04L 67/1095* (2013.01); *H04L 67/16* (2013.01); *H04L 67/42* (2013.01); *H04W 76/021* (2013.01); *H04L 43/16* (2013.01); *H04L 67/06* (2013.01)

(56) References Cited

U.S. PATENT DOCUMENTS

| | | |
|---|---|---|
| 6,691,154 B1 | 2/2004 | Zhu et al. |
| 7,043,525 B2 | 5/2006 | Tuttle et al. |
| 7,346,616 B2 | 3/2008 | Ramanujam et al. |
| 7,424,671 B2 | 9/2008 | Elza et al. |
| 7,437,405 B1 | 10/2008 | Theis et al. |
| 7,467,400 B1 | 12/2008 | Moss |
| 7,546,286 B2 | 6/2009 | Dickinson et al. |
| 7,685,134 B2 | 3/2010 | Myka et al. |
| 7,702,730 B2 | 4/2010 | Spataro et al. |
| 7,774,412 B1 | 8/2010 | Schnepel |
| 7,885,925 B1 | 2/2011 | Strong et al. |
| 7,930,362 B2 | 4/2011 | Rumelhart |
| 7,933,956 B2 | 4/2011 | Hon et al. |
| 8,185,601 B2 | 5/2012 | Rauhala et al. |
| 8,225,311 B1 | 7/2012 | Robertson et al. |
| 8,244,848 B1 | 8/2012 | Narayanan et al. |
| 8,296,644 B2 | 10/2012 | Koren |
| 8,370,423 B2 | 2/2013 | Ozzie et al. |
| 8,510,404 B2 | 8/2013 | Carmel et al. |
| 8,527,549 B2 | 9/2013 | Cidon |
| 8,533,231 B2 | 9/2013 | Aizman et al. |
| 8,611,542 B1 | 12/2013 | Ishii |
| 2002/0059231 A1 | 5/2002 | Kuwano et al. |
| 2003/0046434 A1 | 3/2003 | Flanagin et al. |
| 2003/0117434 A1 | 6/2003 | Hugh |
| 2003/0182327 A1 | 9/2003 | Ramanujam et al. |
| 2004/0230895 A1 | 11/2004 | Elza et al. |
| 2006/0143435 A1 | 6/2006 | Kwon |
| 2006/0242444 A1 | 10/2006 | Novik et al. |
| 2006/0277196 A1* | 12/2006 | Oosawa ............ G06F 17/30887 |
| 2007/0016632 A1 | 1/2007 | Schulz et al. |
| 2007/0288548 A1 | 12/2007 | Creamer et al. |
| 2008/0052783 A1* | 2/2008 | Levy ................. G06F 17/30067 726/26 |
| 2008/0140650 A1 | 6/2008 | Stackpole |
| 2008/0229215 A1 | 9/2008 | Baron et al. |
| 2008/0288499 A1 | 11/2008 | Choi et al. |
| 2009/0030952 A1 | 1/2009 | Donahue et al. |
| 2009/0094602 A1 | 4/2009 | Ziskind et al. |
| 2009/0157693 A1 | 6/2009 | Palahnuk |
| 2009/0282124 A1* | 11/2009 | Rauhala ............ G06F 17/30165 709/216 |
| 2010/0037161 A1 | 2/2010 | Stading et al. |
| 2010/0153857 A1 | 6/2010 | Sanchez et al. |
| 2010/0162126 A1 | 6/2010 | Donaldson et al. |
| 2010/0205148 A1 | 8/2010 | Leblanc et al. |
| 2010/0325153 A1 | 12/2010 | Thakkar et al. |
| 2011/0153696 A1 | 6/2011 | Saxena et al. |
| 2011/0208807 A1 | 8/2011 | Shaffer |
| 2011/0219307 A1 | 9/2011 | Mate et al. |
| 2011/0260860 A1 | 10/2011 | Gupta |
| 2011/0264686 A1 | 10/2011 | Cavagnari et al. |
| 2012/0042282 A1* | 2/2012 | Wong ................. G06F 17/30994 715/811 |
| 2012/0054640 A1 | 3/2012 | Nancke-Krogh |
| 2012/0109590 A1 | 5/2012 | Trainer et al. |
| 2012/0117271 A1 | 5/2012 | Kennedy et al. |
| 2012/0131477 A1 | 5/2012 | Marsden |
| 2012/0179653 A1 | 7/2012 | Araki et al. |
| 2012/0287034 A1 | 11/2012 | Park et al. |
| 2012/0297041 A1 | 11/2012 | Momchilov |
| 2012/0324589 A1 | 12/2012 | Nukala et al. |
| 2013/0013560 A1 | 1/2013 | Goldberg et al. |
| 2013/0021368 A1 | 1/2013 | Lee et al. |
| 2013/0054550 A1 | 2/2013 | Bolohan |
| 2013/0066963 A1 | 3/2013 | Odio et al. |
| 2013/0066964 A1 | 3/2013 | Odio et al. |
| 2013/0132477 A1 | 5/2013 | Bosworth et al. |
| 2013/0132856 A1 | 5/2013 | Binyamin et al. |
| 2013/0138608 A1 | 5/2013 | Smith |
| 2013/0147845 A1 | 6/2013 | Xie et al. |
| 2013/0151581 A1 | 6/2013 | Leggette et al. |
| 2013/0211870 A1 | 8/2013 | Lawson et al. |
| 2013/0254267 A1 | 9/2013 | Hopkins |
| 2013/0332512 A1 | 12/2013 | Roman et al. |
| 2014/0282243 A1 | 9/2014 | Eye et al. |
| 2015/0052458 A1* | 2/2015 | Rothenberger ..... G06F 3/04815 715/757 |
| 2015/0177938 A1 | 6/2015 | Kleinpeter et al. |
| 2015/0180984 A1 | 6/2015 | Poletto et al. |

FOREIGN PATENT DOCUMENTS

| | | |
|---|---|---|
| JP | H11259484 A | 9/1999 |
| JP | A 2011-054092 | 3/2017 |

OTHER PUBLICATIONS

Yousef, Kharsim; O'Neill, Eamonn, "Sunrise: Towards location based clustering for assisted photo management"; ICMI'07: Workshop on Tagging, Mining and Retrieval of Human-Related Activity Information, TMR'07—Workshop Proceedings, p. 47-54, 2007, ICMI'07: Workshop on Tagging, Mining and Retrieval of Human-Related Activity Information, TMR'07—Workshop Proceedings; ISBN-13: 9781595938701.

Henze, Niels; Boll, Susanne, "Snap and share your photobooks"; MM'08—Proceedings of the 2008 ACM International Conference on Multimedia, with co-located Symposium and Workshops, p. 409-418, 2008, MM'08—Proceedings of the 2008 ACM International Conference on Multimedia, with co-located Symposium and Workshops; ISBN-13: 9781605583037; DOI: 10.1145/1459359. 1459414.

Cathy Marshall; John C. Tang, "That syncing feeling: early user experiences with the cloud"; Published in: DIS '12 Proceedings of the Designing Interactive Systems Conference pp. 544-553 ACM New York, NY, USA 2012.

Buford, J.; Mahajan, K.; Krishnaswamy, V., "Federated enterprise and cloud-based collaboration services"; Source: 2011 IEEE 5th International Conference on Internet Multimedia Systems Architecture and Application (IMSAA), 6 pp., 2011.

International Search Report issued in PCT/US14/072110 dated Mar. 11, 2015.

International Search Report issued in PCT/US14/072115 dated Mar. 11, 2015.

U.S. Appl. No. 14/247,528, Feb. 18, 2016, Office Action.
U.S. Appl. No. 14/247,528, Sep. 1, 2016, Notice of Allowance.
U.S. Appl. No. 14/247,607, Mar. 29, 2016, Office Action.
U.S. Appl. No. 14/247,607, Oct. 6, 2016, Office Action.
Examination Report as received in European Application 14825577.1 dated Aug. 8, 2017.
Examination Report as received in European Application 14825578.9 dated Aug. 7, 2017.
Notice of Allowance as received in Japanese patent application dated Oct. 10, 2017.

(56) References Cited

OTHER PUBLICATIONS

U.S. Appl. No. 14/247,607, dated Nov. 16, 2017, Office Action.

* cited by examiner

SYSTEMS AND METHODS FOR MAINTAINING LOCAL VIRTUAL STATES PENDING SERVER-SIDE STORAGE ACROSS MULTIPLE DEVICES AND USERS AND INTERMITTENT NETWORK CONNECTIONS

CROSS-REFERENCE TO RELATED APPLICATIONS

This application is a continuation of U.S. application Ser. No. 14/247,528, filed Apr. 8, 2014 and claims the benefit of U.S. Provisional Patent Application No. 61/945,816, filed on Feb. 27, 2014, U.S. Provisional Patent Application Publication No. 61/945,814, filed on Feb. 27, 2014, and U.S. Provisional Patent Application No. 61/920,730, filed on Dec. 24, 2013. Each of the aforementioned application(s) are hereby incorporated by reference in their entirety.

FIELD OF THE INVENTION

Various embodiments generally relate to systems and methods for maintaining local virtual states pending server-side storage across multiple devices and users and intermittent network connections.

BACKGROUND

While photograph applications, video applications, and other content sharing applications have become increasingly popular, the services and features currently provided by these sorts of applications come with inherent limitations. Recognizing these limitations, online content management systems ("CMSs") offer a user a convenient portal for cloud storage and interactivity with his or her content. In such systems, as well as in corresponding applications running on user devices, users may upload and perform various operations to content, such as photographs and videos, for example. Some of these operations may be quite complex, and may involve large amounts of content. Such operations may, for example, include uploading photographs and/or videos to a user account, receiving shares of photographs and/or videos from other users, and copying photographs and/or videos to a user account, sharing photographs and/or videos with other users of the content management system, creating and sharing albums or collections of content items, and/or interacting with the content items, or any interaction with content, or any combination thereof.

Conventionally, there are various options available where such a local application may be implemented. For example, one option may be to implement the application locally as a standalone application. This option would rely on some sort of messaging feature to pass content received from other users to the user device. This option, however, limits the amount of content a user may store in their account to the capacity of their user device running the local application, and requires complex messaging and management of data creation to replicate the state of content items that are exchanged or shared across all relevant user devices.

Another option may be, for example, an application implemented on a server with every local action being supported by the server. In this scenario, the server controls the "existence" of content in any user account, and the server must record any operations (e.g., modifications, shares, messages, etc.) between the user device and the user, or the user device and other devices. This option may afford many opportunities for storing large amounts of data, as well as managing sharing and other interactions between users of the content management system. For example, shared virtual spaces where various users of the content management system are "members" may be provided to share content and post messages related to such content in a separate manner as opposed to simply in a user account.

However, this option has drawbacks because the server driven model limits local interaction to only when connectivity is high, or meets a certain threshold. If a user device is weakly, or intermittently connected to the content management system server across a data network (e.g., a smartphone connected to a cellular network), content created, and actions taken, on the user device that require the content management system server to store, acknowledge, organize, and/or manage the content cannot be processed until the appropriate connectivity is restored. For example, a user may upload a collection of photographs from his/her smartphone using a content management system application, but may not see the photographs appear in their user account for many hours. Because the photographs do not yet appear within the account, the user cannot share them with others, review them, modify them, or perform any other action to the photographs. This may cause the user experience to be extremely dissatisfying and frustrating.

Thus, it is highly desirable for a user to be able to experience a seamless response of a content management system application running on his or her user device, to (i) the creation of content, (ii) the addition of photos or messages to a user account or other user accessible data structure, (iii) the downloading of shared content to a personal account on the content management system, and to (iv) other responses to his or her interactions with the application. However, unless connectivity to the server is guaranteed to be sufficient, this may not always be possible. This may correspond to the fact that while the connectivity on a user device between the user interface and the underlying client software is permanent, the connection between the underlying client software and the server may often be intermittent.

Thus, it would be beneficial to provide users of content management systems with the experience of a seamless response of a content management system application running on their user device as if all backend operations were occurring locally.

SUMMARY

Systems, methods, and non-transitory computer readable media are provided for maintaining local virtual states pending server-side storage across multiple devices and users and intermittent network connections. In some embodiments, any content added by a user to their user account locally on a user device may be displayed, and all interactivity therewith may be facilitated as if the content had already been created on the content management system.

Moreover, in content management system applications that support shared virtual spaces, changes made by a user on their user device to the shared virtual space may be displayed locally as soon as the changes have been made and having any latency for the information to be transmitted to the server or its state to be made compatible with the user device. Thus, a number of shared virtual spaces may be created locally, and various content items may be added to them prior to any information reaching the content management system server. To the user, these actions may appear as if the information had already reached the content management system server. Thus, in some embodiments, any content item added by the user to a shared virtual space may be displayed, along with any message or post added to or associated with the content item, as if (i) the shared virtual space had already been created on the content management system, and (ii) the content item had already been copied to it. A similar functionality may also occur for adding content to an already existing shared virtual space.

BRIEF DESCRIPTION OF THE DRAWINGS

The above and other aspects and advantages of the invention will become more apparent upon consideration of the following detailed description, taken in conjunction with accompanying drawings, in which.

DETAILED DESCRIPTION OF THE DISCLOSURE

Figure 1:
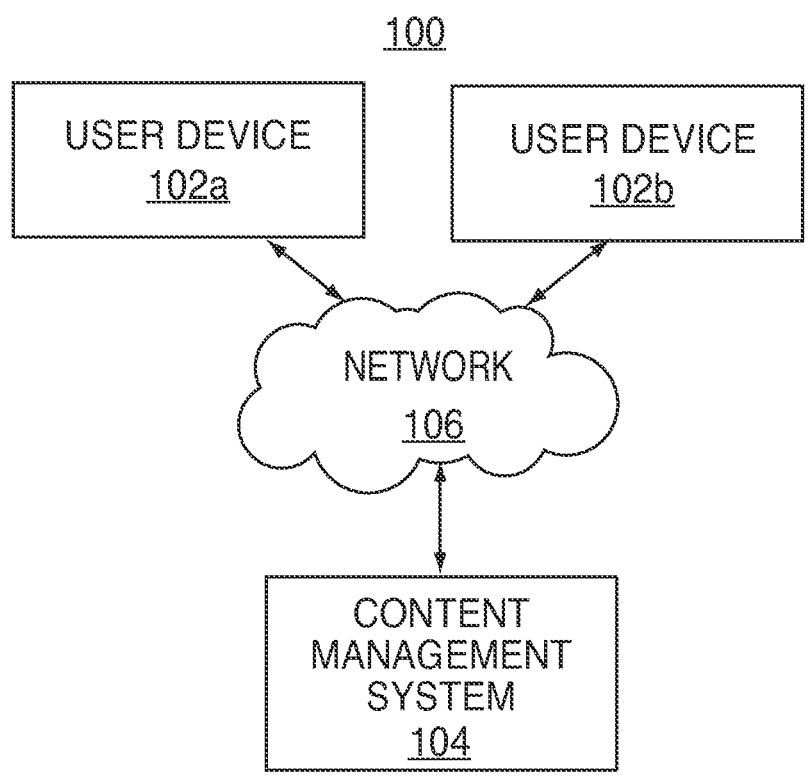
FIG. 1 shows exemplary system in accordance with various embodiments.

Methods, systems, and computer readable media for supporting the creation of local content, and a set of interactivity features with that content, on a local user device, notwithstanding intermittent network connections, are provided. In various exemplary embodiments, content added by a user to his or her user account locally on a user device may be displayed thereon, and all interactivity may be facilitated therewith as if the content had already been created on the content management system (e.g., at its server).

This functionality may be integrated into an existing content management system or service, provided as a separate application, or included as one or more features of a separate application providing enhanced content management services. An exemplary content management system application may run on a user device, such as, for example, a smartphone, and may access a user account on a content management system and thus the content management system's remote server or servers. Such an application may support complex multi-party interactions, such as, for example, a shared virtual space functionality. While in each case the application may ultimately be supported from a server or servers, extended functionality may, in some embodiments, be built into a local client running on the user device such that the shared virtual space functionality appears as if it is running locally on the user device. This functionality may occur regardless of whether the user device is weakly, intermittently, or even not at all connected to the server. By enabling a user to feel as though their device is fully interactive regardless of connectivity level, the user experience and richness of functionality provided may be greatly increased.

It is noted that the terms "device" and "content management system" are used herein to refer broadly to a wide variety of storage providers and data management service providers, electronic devices and user devices. It is also noted that the term "content item" is user herein to refer broadly to a wide variety of digital data, documents, text content items, audio content items, video content items, portions of content items, and/or other types of data. Content items may also include files, folders or other mechanisms of grouping content items together with different behaviors, such as collections of content items, playlists, albums, etc. The term "user" is also used herein broadly, and may correspond to a single user, multiple users, authorized accounts, an application or program operating automatically on behalf of, or at the behest of a person, or any other user type, or any combination thereof. The term "gesture" and "gestures" are also used herein broadly, and may correspond to one or more motions, movements, hoverings, inferences, signs, or any other such physical interactions with one or more sensors, or any combination thereof, including vocal commands or interpretations of eye movements based on retinal tracking. The term "continuous real-time image" is also used herein broadly, and may correspond to live images captured via one or more image capturing components, continuous images captured, recorded images, or any other type of image that may be captured via an image capturing component, or any combination thereof.

The present invention may take form in various components and arrangements of components, and in various techniques, methods, or procedures and arrangements of steps. The referenced drawings are only for the purpose of illustrating embodiments, and are not to be construed as limiting the present invention. Various inventive features are described below that can each be used independently of one another or in combination with other features.

FIG. 1 shows an exemplary system in accordance with various embodiments. System 100 may include user devices 102a and 102b, which may communicate with content management system 104 across network 106. Persons of ordinary skill in the art will recognize that although only two user devices are shown within system 100, any number of user devices may interact with content management system 104 and/or network 106, and the aforementioned illustration is merely exemplary.

Network 106 may support any number of protocols, including, but not limited to, Transfer Control Protocol and Internet Protocol ("TCP/IP"), Hypertext Transfer Protocol ("HTTP"), and/or wireless application protocol ("WAP"). For example, user device 102a and user device 102b (collectively 102) may communicate with content management system 104 using TCP/IP, and, at a higher level, use a web browser to communicate with a web server at content management system 104 using HTTP.

A variety of user devices 102 may communicate with content management system 104, including, but not limited to, desktop computers, mobile computers, mobile communication devices (e.g., mobile phones, smart phones, tablets), televisions, set-top boxes, and/or any other network enabled device. Various types of user devices may include, but are not limited to, smart phones, mobile phones, tablet computers, personal digital assistants (PDAs), laptop computers, digital music players, and/or any other type of user device capable of including a touch-sensing display interface. Various touch-sensing display interfaces may include, but are not limited to, liquid crystal displays (LCD), monochrome displays, color graphics adapter (CGA) displays, enhanced graphics adapter (EGA) displays, variable-graphics array (VGA) displays, or any other display, or any combination thereof. In some embodiments, the touch-sensing display interface may include a multi-touch panel coupled to one or more processors to receive and detect gestures. Multi-touch panels, for example, may include capacitive sensing mediums having a one or more of row traces and/or driving line traces, and one or more column traces and/or sensing lines. Although multi-touch panels are described herein as one example for touch-sensing display interface, persons of ordinary skill in the art will recognize that any touch-sensing display interface may be used. Furthermore, various types of user devices may, in some embodiments, include one or more image capturing components. For example, user devices 102 may include a front-facing camera and/or a rear facing camera.

Content management system 100 may allow a user with an authenticated account to store content, as well as perform management tasks, such as retrieve, modify, browse, synchronize, and/or share content with other accounts. In some embodiments, a counter-part user interface (e.g., stand-alone application, client application, etc.) on user devices 102 may be implemented using a content management interface module to allow a user to perform functions offered by modules of content management system 104. A more detailed description of system 100 is presented below, with reference to FIG. 7.

Figure 2:
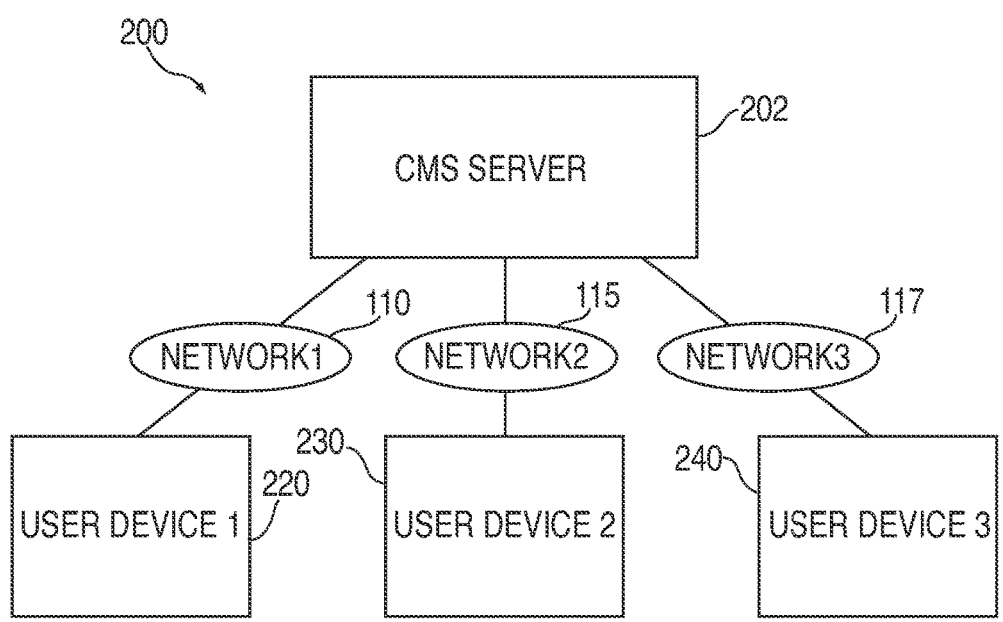
FIG. 2 shows a schematic illustration of an exemplary simplified network where three user devices connect to a content management system server over three data networks in accordance with various embodiments.

FIG. 2 shows an exemplary simplified network of three user devices (e.g., smartphones) each connected across a network (e.g., a cellular network) to a content management system server. System 200 may also include content management system ("CMS") server 202 and three user devices, namely 220, 230 and 240. In some embodiments, user device 220 may be connected to the content management system server 202 across Network1 110, user device 230 may connected to the content management system server 202 across Network2 115, and user device 240 may connected to the content management system server 200 across Network3 117. Because each of these user devices may have a different network connection, and may generally be located in different places, any interactions between user devices, or user devices and the content management system server, will generally have different network delays or latencies in network connectivity.

In some embodiments, each of user devices 220, 230 and 240 may include an interactive application provided by a content management system. The included interactive application on each device may cause timing conditions between the user devices to occur. For example, if each of the three user devices shown decide to create a virtually shared space including all three user devices as members, although one may have locally created the shared virtual space first on their user device, it may happen that a different user device's requests may reach the server first. Thus, the server would "credit" that user with having originally created the shared virtual space. In some embodiments, system 200 may also illustrate how a content management system application running locally on a user device may need to maintain connected to the content management system at a sufficiently high level to maintain the bandwidth necessary to provide a set of interactive features to each user device. There may be many instances where (i) objects created (e.g., capturing or uploading a photograph), or (ii) multi-party, multi content item data structures or constructs created (e.g., a user creates a shared virtual space), or (iii) a user interacts with either an object (e.g., a photograph) or a shared virtual space after having created it but prior to its creation being "known" by the server. In such instances, the various systems and methods according to exemplary embodiments of the present invention are operative.

To illustrate certain aspects of the present invention, local interaction as regards a shared virtual space functionality will be referred to. Such functionality is described in detail in U.S. Provisional Patent Application No. 61/945,814, filed on Feb. 27, 2014 under common assignment herewith, entitled "SYSTEMS AND METHODS FOR CREATING SHARED VIRTUAL SPACES," the disclosure of which is incorporated herein by reference in its entirety.

Multi-party shared virtual spaces, which may be referred to as "shared virtual spaces" or singular "shared virtual space," correspond to a virtual space accessible by a set of users of a content management system who may mutually share content items and messages relating thereto. The content management system may maintain a user's shared virtual spaces and/or all content items and messages therein with the user account. The content management system may also support any and all shared virtual space interactions. The multiple parties within a shared virtual space may include the creator and any other persons with the creator have shared the initial content with. These parties may sometimes be referred to as "members" of the shared virtual space, or shared virtual space members. In some embodiments, a shared virtual space may be automatically created in response to a user of a content management system sharing one or more content items, or posting one or more messages about content items with another user. For example, a share request may be sent to one or more of a user's contacts to share one or more content items. In response to the share request being sent, a shared virtual space may be automatically created that includes a copy of the one or more content items shared. In some embodiments, the shared virtual space may be associated with an assigned memory location on a server. In some embodiments, the shared virtual space may be accessed by both the user and the other members, and they may each add further content (e.g., content items, images, and/or messages, etc.) to the shared virtual space. In some embodiments, whenever any content is added to a shared virtual space, all member parties may be notified. In some embodiments, other non-members may also be notified, even persons not registered as users with a content management system providing the shared virtual spaces service or application. Notifications may be by in-band (e.g., within a content management system or related application), out-of-band (e.g., email, SMS, social media notification or post), or any combination of these communications pathways.

In some embodiments, members of a shared virtual space may exclusively be registered users of the content management system providing the shared virtual spaces functionality. In other embodiments, non-registered users of the content management system may be allowed as members of shared virtual spaces, either in whole or in part. A user of a content management system may therefore be a "member" or a "non-member" as regards a shared virtual space.

In some embodiments, members of a shared virtual space may copy any content in the shared virtual space to their user account on the content management system, and may also freely send copies of content from a shared virtual space to other persons via email, SMS or post to social media. Each party invited to a shared virtual space may conveniently access the shared virtual space at any time, and may be a permanent data structure with the server hierarchy designed to hold, as well as facilitate, mutual interaction with all content and members. In some embodiments, content item added to a shared virtual space may be copied to a separate "rooms database" and locked such that it cannot be further modified. For example, an image place within a rooms database may remain locked even if its original owner subsequently modifies the original content item within his or her own user account. Any such modifications will therefore not be applied to the content items copied to the shared virtual space. The content may be saved in the shared virtual space for a defined period of time, which may, in some embodiments, be indefinite.

In some embodiments, local changes made by a user on their user device to a shared virtual space (e.g., additions of content items, posts, adding new members, deleting members, merging with another shared virtual space, etc.) may be displayed locally as soon as the change has been made. This may occur because there may be no need to wait for the information to be transmitted to the server and then the server's state to be made consistent with that of the user device, prior to being displayed locally. Thus, locally on the user device, a number of shared virtual spaces may be created, various content items added to them, and various persons added to them as members, as well as various other interactions may occur prior to any information reaching the content management system server. To the user, it may appear as a completed task as soon as the interaction occurs.

In some embodiments, user content and user interactions may be managed by a server of a content management system, and a client application of the content management system may run on a user device that may be in communication with the server over a data communications network. Further, it is highly desirable for a user of a user device to be able to experience a seamless response of the system to (i) the creation of content (e.g., shared virtual spaces), (ii) the addition of content items to a user account or an existing shared virtual space, (iii) the downloading of content from a shared virtual space to a user account on the content management system, and/or to (iv) other responses to a user's interactions with the client application. This is not always easily accomplished because, while the connectivity on a user device between a user interface and the underlying local client software is permanent, the connection between the underlying client software and the remote server may be intermittent.

Thus, in some embodiments, content may be managed with reference to a unique index number or identifier assigned to, or associated with, the content. Typically, standard content management systems have each user assigned to a unique identifier, and all content and interactions of that user utilize the unique identifier to allow the content management system to properly store content items in his or her account, as well as store and implement various supported interactions.

Whether a user may create a shared virtual space by initiating a share of certain content, or adding content to a pre-existing shared virtual space, to the server these operations appear substantially the same, with the exception that in the latter case a Room ID for the shared virtual space may already exists, whereas in the former case there may be no Room ID for the shared virtual space when the share is made. When a user first creates a shared virtual space, a request for a Room ID may be sent from the underlying client software over the data network to the server of the content management system. If the client application has to wait until the Room ID is in turn received back from the server, it cannot create the shared virtual space and thus cannot show the content within the shared virtual space until the Room ID is received. This may likely cause wait states if the connectivity between the client application and the server is intermittent. In order to create the experience on the user device of local functionality, the fundamental problem that must be solved is how to prevent a weak or intermittent data connection from interfering with what the user may actually be seeing. Thus, after the user, via the user interface, injects requests and queues tasks, within the underlying software, to preserve local functionality to the extent possible, these actions must be reflected back into the user interface even if the server has not yet acknowledged these actions and/or fulfilled or processed the requests.

As an illustrative example, a user while offline may create a shared virtual space. The user may take a number of photos, click share, and/or add a person to the shared virtual space, which may send a message to the underlying software indicating that a shared virtual space has been created. At that point, the software may tell the user interface that a new shared virtual space has been created and, in parallel, communicate to the server that a new shared virtual space has been created. However, if the server is not accessible, the communication from the software will not be delivered. Nonetheless, the user may still add a comment to a shared virtual space because to the user, the shared virtual space has been created. Thus, it is necessary to show the comment in that shared virtual space.

Thus, even if connectivity is weak or intermittent, the user may nonetheless desire to have a smooth and nearly seamless local experience that may provide the user with the sense that creation of a shared virtual space always succeeds. In some embodiments, even though at some point the software will send the message to the server, and in the meantime, a simulated version of the new post may occur. The client software may create a local ID and a new post table (a table that manages: which posts are in a shared virtual space, which shared virtual spaces there are, etc.). The software may create these results locally as if the new shared virtual space existed globally and as if the content was really posted to a shared virtual space. After the server responds, in order to maintain seamless interaction on each user device, the global Room ID must be associated with the local Room ID, and the local Room ID may be replaced by the global Room ID in such a way so as not to execute any local action twice, or not at all. Thus, if a local Room ID is included in a queued instruction, the switch of IDs may occur either while the instruction is in a queue, but not yet executed, or after execution. Therefore, the switch may avoid happing during execution, which may create ambiguity.

As another illustrative example, a user may capture some photos with their user device that may also have a client application running thereon. The user may upload the photos to a user account on the content management account, and shares them with one or more family members. However, the user may not add the photos to the shared virtual space that the user and the user's family members have. In some embodiments, this new share may create a new shared virtual space. In some embodiments, the user device may not be connected to the content management system server due to network connectivity issues. For this reason, the photos may not yet have been uploaded to the server even though they have been were added to the user account locally. Because the photos may have already been added to the user account, they may not have been added to a shared virtual space locally, and therefore the photos and the new shared virtual space may all have only local IDs. The tasks of requesting global IDs for each of these content items and the shared virtual space, and the task of adding the photos to the shared virtual space may be queued, and may begin to be executed locally. If connectivity to the server returns while some of these instructions are in the process of being implemented, it may be necessary to manage the replacement of the local IDs with the global IDs so that no task is dropped or performed twice (e.g., once referencing the local ID and a second time referencing the global ID).

Figure 3:
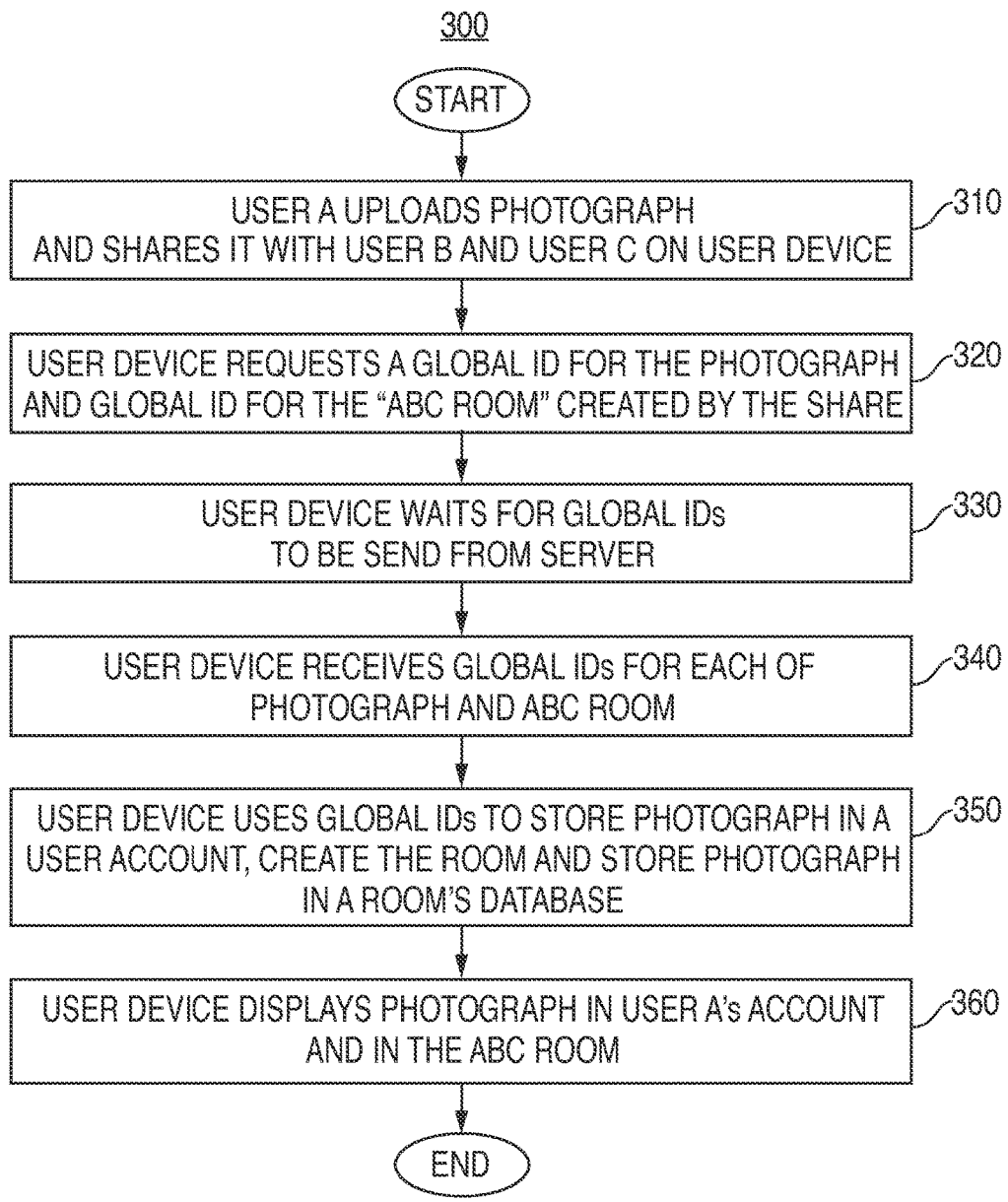
FIG. 3 shows an illustrative flowchart of an exemplary process for uploading and sharing photographs with other users on a user device in accordance with various embodiments.

FIG. 3 shows an exemplary process of a conventional content management system application running on a user device that may introduce various wait state in accordance with various embodiments. In this particular scenario, no method or system by which an object or data construct created by a user interacting with a content management system on their user device may proceed until the content management system server connected to the user device acknowledges creation and assigns a global ID to the object or data construct.

Process 300 may begin at Start and moves to 310 where User A may upload and share a photograph with each of User B and User C via User A's user device. For purposes of illustration, the application depicted in FIG. 3 is the novel "rooms" functionality, and portrayed as if implemented in a conventional server based system. In such a functionality, a user may create a shared virtual space by sharing a content item, such as a photograph or video with one or more other users. After such an initial sharing is done, a shared virtual space may be created by the system. Therefore, at 310, two logical objects may be created: (1) the photograph uploaded from User A's user device into his or her user account on the content management system, and (2) the shared virtual space created by the system as soon as User A shares that photograph with User B and User C. Therefore, there are two objects that need to be created by the content management system and assigned a global ID. Additionally, the content management system may need to associate the first object (e.g., the photograph), with the second object (e.g., the shared virtual space). This link may be reflected in a record associated with the shared virtual space that may be identified by the assigned global ID.

From 310, process flow 300 may move to 320 where the user device processes the user's actions described in 310. The user device may request a global ID for the photograph and a global ID for the shared virtual space, it being understood that in this particular embodiment, there may only be global IDs. The shared virtual space, which may be referred to as the "ABC Shared virtual space", may be created by User A when the photograph has been shared with Users B and C. As noted, not only will the global IDs be required for both of those objects (e.g., photograph and shared virtual space), but instruction will also need to be sent to associate the photograph by its ID with the ABC Shared virtual space by its ID.

From 320, process flow 300 may move to 330. Herein lies the distinction from the present invention: the user device must wait for the global IDs to be sent from the content management system's server before it may treat those objects as even existing, and then display them within the user's application on the user device. If there is no issue of network latency or connectivity, the user will not perceive any delay or latency at step 330. However, if for some reason a network delay occurs (e.g., network congestion, the user is travelling in an area where the signal is either barely present, marginally present and/or not present), then there could be long periods of time where the user device may be disconnected from the network. In such instances step 330 may be quite onerous, and a user may give up in frustration. The user may have to wait seconds or more for the photograph to be displayed within the user account or to be shared it, or for the shared virtual space to exist and the photograph to be shown within the user account and be displayed in the shared virtual space.

From 330, process flow 300 may move to 340 where the user device may receive global IDs for each of (i) the photographs and (ii) ABC shared virtual space. From 340, the process flow may move to 350 where the user device may use the global IDs to (a) store the photograph in the user account, (b) create the ABC shared virtual space, and (c) store the photograph in a room database so that it may be associated with and displayed in ABC shared virtual space. From 350, process flow 300 may move to 360 where the user device may display the photograph in User A's user account, display the ABC shared virtual space within the user's content management system application, and display the photograph in the ABC shared virtual space. And from there, process flow 300 may end.

As noted, significant drawbacks of process flow 300 will be felt by the user anytime the user device has marginal, weak, or no connection to the content management system. It is to remedy this situation, and prevent associated wait states or glitches, that the exemplary process flow depicted in FIG. 4 may be implemented in various embodiments.

Figure 4:
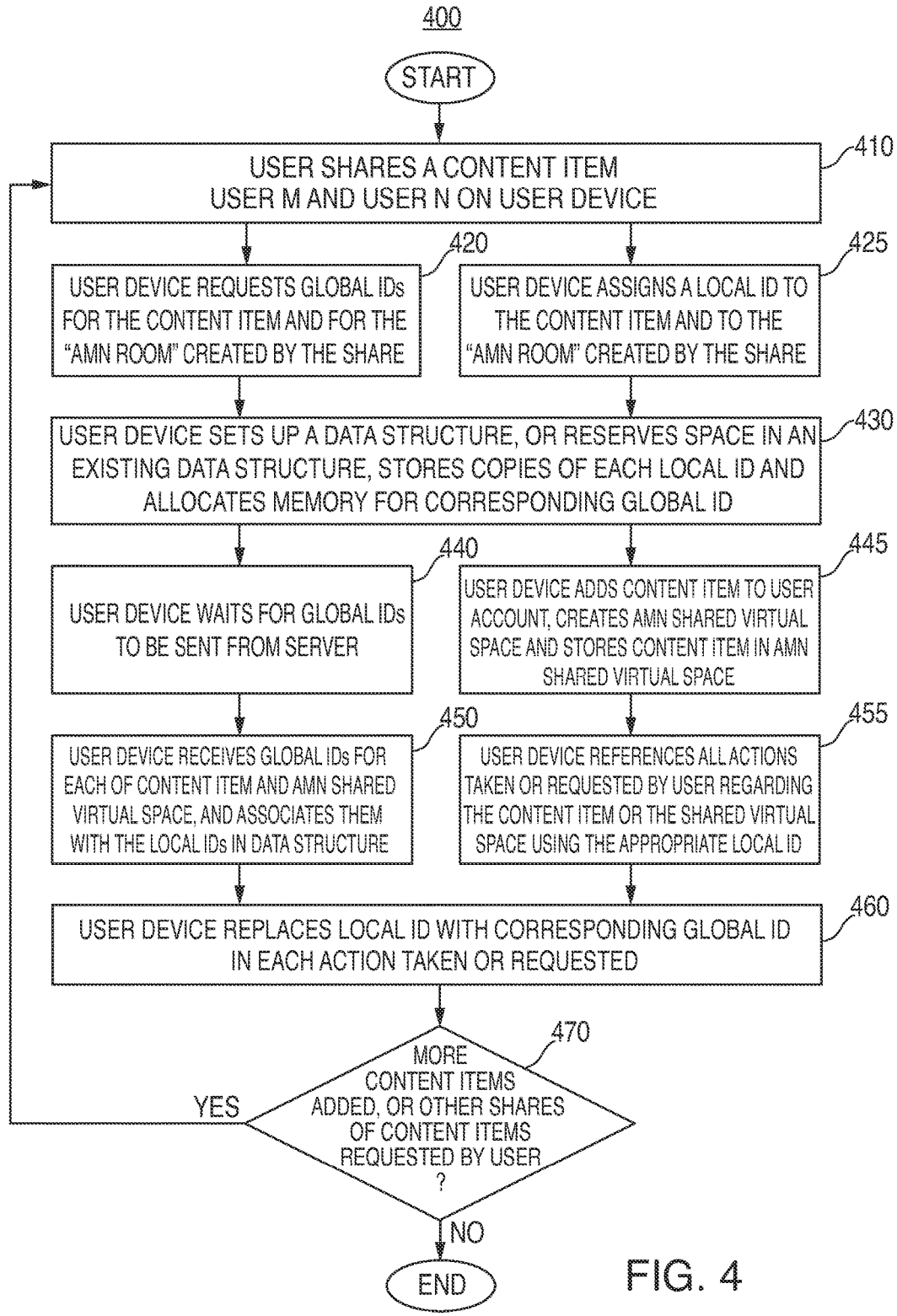
FIG. 4 shows another illustrative flowchart of a process for uploading and sharing photographs with other users on a user device in accordance with various embodiments.

FIG. 4 shows an exemplary process flow in accordance with various embodiments. Process flow 400 may begin at Start, and may move to 410 where User A may share a content item with User M and User N on a user device. In some embodiments, User A may share an existing content item with Users M and N, or the User A may upload a content item to be shared with Users M and N. This step may be analogous to 310 of FIG. 3 where a number of objects may be created that will need to be identified by the content management system for implementation and execution. For example, User A may upload a photograph, which may create a new content item to be assigned an identifier. When the user shares the photograph with other users (e.g., User M, User N), a shared virtual space may be created that may also need to be assigned an ID and implemented. By implementation, it is understood that the shared virtual space will show up within the user account on the content management system. Alternatively, if the user shared an existing photograph (e.g., a photograph already stored in the user account) with Users M and/or N, the photograph may already have an ID, which may be a global ID, and thus there is no new ID that is needed to be created by this action is the shared virtual space. This, however, may actually involve a number of steps. First, the shared virtual space may be created and an ID assigned to it (e.g., a Room ID). Next, any content item placed in the shared virtual space (i) by virtue of sharing initially with members of the shared virtual space or (ii) subsequently by sharing within an already existing shared virtual space, a copy of the content item may be created and stored in a separate database—besides the original copy in the user account of the sharer—so that it cannot be changed. In addition to creating the separate copy of the content item, it may have to be associated with the shared virtual space in a record holding information regarding all of the content items and members of the shared virtual space and any interactions by the members within the shared virtual space regarding those content items. For example, a member of a shared virtual space may: (i) post messages regarding content items, (ii) copy the content item to their own account, and/or (iii) perform other tasks. For each, an instruction may issue on the user device, the instruction referencing an identifier of the object involved and the shared virtual space involved.

From 410, process flow 400 may bifurcate, and moves to 420 and 425 in parallel. This illustrates a novel functionality according to exemplary embodiments of the present invention, which facilitates a seamless interaction on the user device even when connectivity to the network has been terminated or is intermittent. With reference to 420, the user device may requests global IDs for the content items and for the "AMN Shared virtual space" created at 410. In some embodiments, step 420 of FIG. 4 may be substantially similar to step 320 of FIG. 3, and the previous description of the latter may apply to the former. However, in parallel and without any delay or waiting period, at 425 the user device may assign a local ID to the content item and to the AMN shared virtual space. This may allow the photograph as well as the shared virtual space to "exist" on the user device even if they have never been officially recognized by the content management system server. Moreover, this parallel process may begin as soon as the user action at 410 occurs. This may avoid any delays and may create the seamless local interaction perceived by the user. From 420 and 425, process flow 400 may move to 430 where the user device may set up a data structure, reserve space in an existing data structure, store copies of each local ID created at 425, and/or allocate memory for a corresponding global ID that may be received from the content management system server after connectivity has been restored. The data structure may be, for example a look-up table, a translation table, a database record, or any other convenient logical association that allows a subsequent process to quickly and easily match up the global IDs—once they are received from the content management system server—with the local IDs generated at 425.

From 430, process flow 400 may again bifurcate, with one path dealing with the global IDs and the other with the local IDs. At 440 the user device may wait for the global IDs to be sent from the content management system server. Step 440 of FIG. 4 may, in some embodiments, be substantially similar to step 330 of FIG. 3, and the previous description of the latter may apply to the former. However, in parallel at 445, the user device may now (i) add the content item to the user account, (ii) create the AMN shared virtual space, and (iii) store the content item in the AMN Shared virtual space, all using their local IDs. Adding a content item to a user account as described herein may also imply displaying the content item within the user account upon its creation, not waiting for the server to send back a global ID before it may be manipulated.

Similarly, the "AMN shared virtual space" may also be immediately displayed within the client application, even though it does not yet "exist" from the point of view of the content management system server. Here, it is important to note that the AMN shared virtual space created by User A may be displayed on User A's user device even if a similar AMN shared virtual space has already been created by User M or User N by sharing, for example, their own photograph with Users A and N, or with Users A and M, as the case may be. In this scenario, another "AMN shared virtual space" may already exist from the point of view of the content management system server. The parallel AMN shared virtual spaces may appear on each of User A's, User M's and User N's user devices although only one of them has been recognized, or will be recognized, by the content management system server, and therefore eventually assigned a global ID.

From 440, process flow 400 may move to 450 where the user device may receive the global IDs for each of the content item and the AMN shared virtual space, and associates them with their respective local IDs in the data structure. Persons of ordinary skill in the art will recognize that data structures, as referred to at step 430, may correspond to any data structure or hierarchy, and the aforementioned is merely exemplary. For example, if the data structure corresponds to a lookup table, each local ID in the look up table may have a corresponding global ID associated with it. This may be accomplished, for example, by the user device including the local ID, or a reference thereto, when requesting the global ID. Thus, when the global ID returns from the server, it may know which local ID it corresponds to. This may also prevents mistaken assignment of multiple global IDs if the user device resends the same request of step 420 repeatedly, or if it does not receive a response back from the server. This may occur, for example, if there is a network delay, or a failure of the user device where the request may be resent by the user device from a cache, or the like, following the failure. Alternatively, for example, the request for global IDs sent to the server (at 420) may include an operation, or instruction number, and/or other unique identifier, to allow the server to filter out redundant requests.

Similarly, from 445 process flow moves to 455 where the user device references all actions taken or requested by User A regarding the content item or shared virtual space, using the appropriate local ID (e.g., either a photo ID or a Room). Thus, User A may continue to manipulate, operate, and/or interact with both the content item as well as the newly created shared virtual space, and any other content the user may add to the shared virtual space. Every interaction involving the content item, such as, for example, attaching a message to it, activating a "like" indicator, or any other interaction, and/or sharing it with yet another party not a member of the shared virtual space may be referenced by the user device using the local ID for the content item. Similarly, if the user now decides to add additional content items, whether they are already uploaded to their user account or not, to shared virtual space AMN, the content items may now all be given local IDs (if they do not already have them). These content items may now be associated with shared virtual space AMN, using the local Room ID for the shared virtual space assigned at 425. Thus, it may easily be imagined how, depending on the amount of time the of the user device and the server may not be connected, a number of objects may be created and a number of instructions for requesting interactions with those objects may be queued all using the local IDs.

From 450 and 455, process flow 400 unites again at 460 where the user device, now having received global IDs at 450, may replaces each local ID in a queued instruction with the corresponding global ID related to each action taken or requested to be taken. Thus, all the local IDs being used to reference content items appearing in User A's user account, or content items copied and associated with a shared virtual space, or a shared virtual space itself, may now have their local ID replaced with the newly acquired global IDs so that the local state may be synchronized with that of the server.

From 460, process flow 400 may move to 470. At 470, the process queries if the user has added more content items to their user account, or has requested additional shares. For example, the process may determine if there are more content items added, shared virtual spaces added, and/or content added to shared virtual spaces. If, YES, then process flow 400 may return to 410. If NO at 470, then process flow ends.

It is noted that process flow 400 of FIG. 4 is merely illustrative, and would equally apply to any content item, data structure, message, or interaction therewith that would be assigned an ID number in the content management system.

Figure 5:
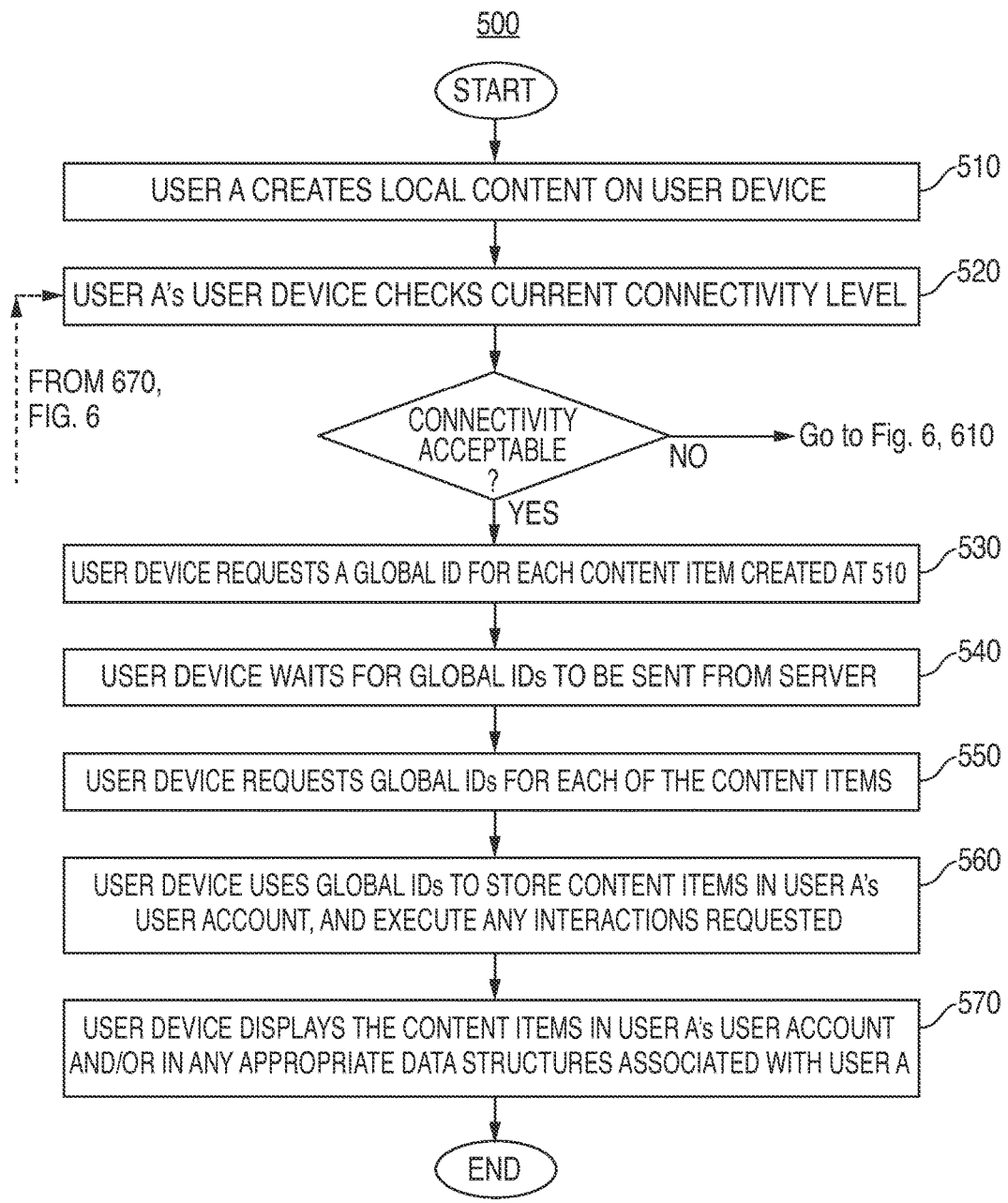
FIGS. 5 and 6 show additional illustrative flowcharts of a process for creating content locally on a user device and interacting therewith in accordance with various embodiments.
Figure 6:
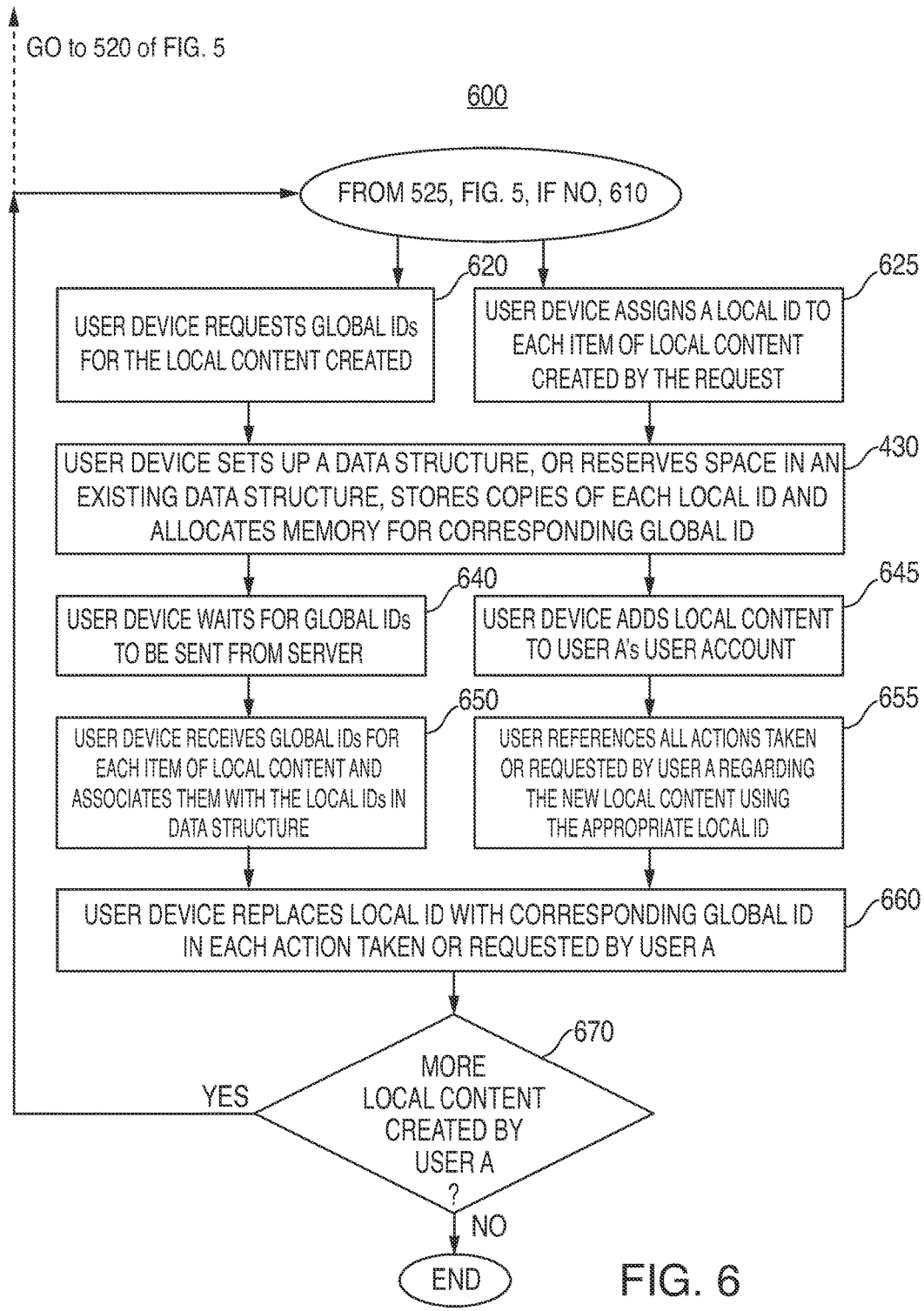

FIGS. 5 and 6 show exemplary process flows in accordance with various embodiments. The processes shown in FIGS. 5 and 6 may continually check the connectivity level of the user device and use local IDs when necessary, otherwise waiting for the server to assign a global ID and then proceeding when connectivity returns to a suitable level. When connectivity is high, processing on the user device may be saved and the need for matching up local IDs with global IDs may be obviated.

With reference to FIG. 5, process flow 500 may begin at Start and moves to 510 where User A may create content locally on a user device. The created local content may correspond to any type of content or action supported by the content management system, including uploading or sharing content items, creating a shared virtual space, adding people to a shared virtual space, merging a shared virtual space with another, posting a message to a shared virtual space, or the like. At 520, the user device may check the current connectivity level. This query is depicted at 525. Here the process may bifurcate into two paths: one that uses Local IDs, as shown in FIG. 6, and one that relies only on global IDs assigned by the content management system server, as shown in the remainder of FIG. 5. Thus, if YES at 525 (e.g., sufficient connectivity), process 500 may continue to 530 where the user device requests a global ID for each content item created at 510, and then may continue to 540 where the user device waits for global IDs to be sent from the server. Process flow 500 may continue to 550 where the user device receives global IDs for each of the content items, and from there process flow moves to 560 where the user device may implement and use the global IDs to store content items in User A's user account, as well as execute any requested interactions. From 560, process flow 500 may move to 570 where the user device may display the content items in User A's user account and/or in any appropriate data structures associated with User A, such as, for example, one or more shared virtual spaces. From 570, process flow 500 may end.

It is noted that the decision at 525 as to whether connectivity is sufficient may be, for example, a simple metric corresponding to any potential network latency, or actual connectivity. In some embodiments, the decision at 525 may be a complex algorithm with various parameters used to define what sufficient connectivity is. These parameters may include, but are not limited to, historical connectivity and/or network strength, both of which long term moving averages and a prior window of a predefined number of hours may be used. Any algorithm designed to predict the viability of the processing (e.g., using only global IDs) may be used. What is not desired, however, is an answer of YES at 525, and then have connectivity break, and no global ID forthcoming for some time. To obviate that event, at 540, for example, processing may time out, and if no global ID is received, then processing may go to 610 of FIG. 6, with a follow up signal that revokes the request at 530, in case it was in fact received. As another example, any suitable mechanism may be used to deal with possible multiple requests to the server for the same global ID, in the event of the user device powering down or losing connectivity prior to receiving a response to a request back from the server.

Continuing with reference to FIG. 5, if the answer to the query at 525 is NO (e.g., insufficient connectivity), then process flow 500 may proceed to 610. With reference thereto, processing flow 600 may bifurcate, similar to process flow 400 of FIG. 4, and at 620 the user device may requests global IDs for the local content created at 510 of FIG. 5. At the same time, at 625, User A's user device may assign a local ID to each item of local content created by the request at 510. From 620 and 625, process flow 600 may unite at 630 where the user device may set up a data structure, reserve space in an existing data structure, store copies of each local ID assigned at 625, and/or allocate memory for each corresponding global ID to be entered when received.

This second aspect of 630, the data structure, may include a look-up table, an association table, a translation table, or any other data structure where the user device may conveniently find the global ID associated to each local ID after it has been received. This allows matching up the temporary local ID with the permanent global ID for any pending instruction in a queue, or in any pending locally created content item or data structure (e.g., a shared virtual space), so that it may be associated with the permanent ID for such data items or constructs. From 630, process flow 600 may once again bifurcate to 640 and 645. At 640, the user device may wait for global IDs to be sent from the server in response to the request made at 620. At step 645, the user device may add local content to User A's user account. This latter step may involve using the local IDs assigned at 625 to add the local content to User A's user account, such as, for example, adding photographs to User A's user account, adding shared virtual spaces created by User A, adding people to shared virtual spaces already existing in which User A is a member, adding messages to a shared virtual space of which User A is a member, sharing any content items from User A's user account.

From 640, process flow 600 may move to 650 where the user device may receive global IDs for each local content item and associates them with the local IDs in the data structure created at 630. At 655, the user device may reference all actions taken or requested by User A regarding the new local content using the appropriate local ID. This may allow User A to interact with any and all content or data structures supported by the content management system application locally as if network connectivity exists, even when it does not.

From 650 and 655, respectively, process flow 600 may unite once again at 660 where the user device may replaces each local ID with the corresponding global ID in each action taken or requested by User A. From 660, process flow 600 may move to 670 where a query may be run to determine whether there is any more local content created by User A. The query may, in some embodiments, be analogous to querying whether process flow should begin again at 510 of FIG. 5. The exemplary process flows of FIGS. 5 and 6 contemplate ongoing interaction by User A with their user device, and therefore, if more content is created, the various steps may be repeated. If, at 670, the answer is YES, then there are two options.

First, process flow 600 may return to 610 where the processing that may assume that insufficient connectivity occurs. Because the device has already decided at 525 that there is insufficient connectivity, it may make sense to perpetuate that assumption and run through the processing of FIG. 6. However, connectivity may resume and thus the answer at 525 may become YES. In this scenario, process flow 600 may be avoided and the processing of FIG. 5 may be implemented. In order to capture such a change in network conditions, at some, or in every instance of a "YES" at 670, the query may be made once again at 520 to check the current connectivity state. In some embodiments, the number of times process flow 600 proceeds through the steps of FIG. 6 before being kicked up to 520 to check connectivity is a parameter that (i) the system may set, (ii) the user may set, or (iii) the system may recommend and the user may override, for example.

Assuming, at 670, the answer is YES, and further assuming that based on system parameters at this juncture it is desired to recheck the connectivity of User A's user device, than process flow 600 may return to 520 of FIG. 5. This may be indicated by the dotted lines at the top of FIG. 6 and the dotted arrow to the left side of 520 on FIG. 5. Once again, the process flows shown in either FIG. 5 or FIG. 6 will occur, depending on the connectivity level.

Persons of ordinary skill in the art will recognize that whether the dotted arrow option moving from 670 of FIGS. 6 to 520 of FIG. 5 is implemented may depend on a variety of factors and how many iterations the process flow has gone through steps 610 through 660. The option may be invoked, for example: (i) after a fixed time limit, (ii) after a dynamic time limit based on an expected data communications path, and/or (iii) according to various other metrics.

Figure 7:
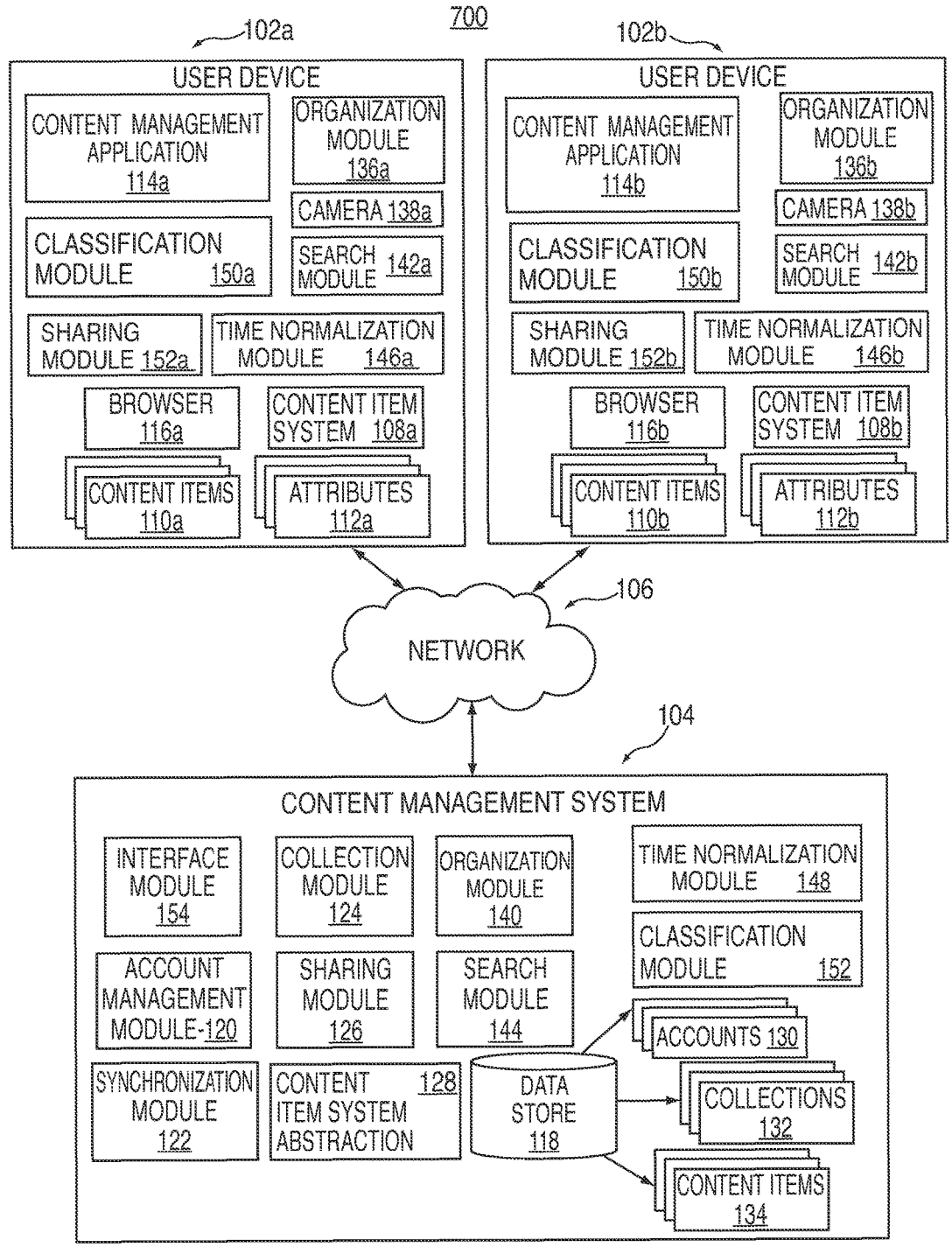
FIG. 7 shows another exemplary system in accordance with various embodiments.

FIG. 7 shows an exemplary system in accordance with various embodiments. In some embodiments, system 700 of FIG. 7 may be substantially similar to system 100 of FIG. 1, with the exception that the former may present elements of system 100 at a more granular level (e.g., modules, applications, etc.).

In some embodiments, user devices 102 may be used to create, access, modify, and manage content items, such as content items 110a and 110b (collectively 110), stored locally within content item system 108a and 108b (collectively systems 108) on user device 102 and/or stored remotely on content management system 104 (e.g., within data store 118). For example, user device 102a may access content items 110b stored remotely with data store 118 of content management system 104 and may, or may not, store content item 110b locally within content item system 108a on user device 102a. Continuing with the example, user device 102a may temporarily store content item 110b within a cache locally on user device 102a, make revisions to content item 110b, and the revisions to content item 110b may be communicated and stored in data store 118 of content management system 104. Optionally, a local copy of content item 110a may be stored on user device 102a. In some embodiments, data store 118 may include one or more collections 132 of content items. For example, collections 132 may include one or more content items having similar properties (e.g., metadata) and/or including similar content.

In some embodiments, user devices 102 may include camera 138 (e.g., 138a and 138b) to capture and record digital images and/or videos. User devices 102 may capture, record, and/or store content items, such as images, using camera 138. For example, camera 138 may capture and record images and store metadata with the images. Metadata may include, but is not limited to, the following: creation time timestamp, geolocation, orientation, rotation, title, and/or any other attributes or data relevant to the captured image. Metadata values may be stored as attribute 112 name-value pairs, tag-value pairs, and/or any other method, or any combination thereof, to associate the metadata with the content item and easily identify the type of metadata. In some embodiments, attributes 112 may be tag-value pairs defined by a particular standard, including, but not limited to, Exchangeable Image File Format ("Exif"), JPEG File Interchange Format (Jfif), and/or any other standard.

In some embodiments, user devices 102 may include time normalization module 146, and content management system 104 may include time normalization module 148. Time normalization module 146 (e.g., 146a and 146b) may be used to normalize dates and times stored with a content item. Time normalization module 146, counterpart time normalization module 148, and/or any combination thereof, may be used to normalize dates and times stored for content items. The normalized times and dates may be used to sort, group, perform comparisons, perform basic math, and/or cluster content items.

In some embodiments, user devices 102 may include organization module 136, and content management system 104 may include organization module 140. Organization module 136 (e.g., 136a and 136b) may be used to organize content items into clusters or collections of content items, organize content items to provide samplings of content items for display within user interfaces, and/or retrieve organized content items for presentation. Organization module 136 may utilize any clustering algorithm. Organization module 136 may be used to identify similar content items for clusters in order to organize content items for presentation within user interfaces on user devices 102 and content management system 104. Similarity rules may be defined to create one or more numeric representations embodying information on similarities between each of the content items in accordance with various similarity rules. Organization module 136 may use numeric representations as a reference for similarity between content items in order to cluster the content items.

In some embodiments, content items may be organized into clusters to aid with retrieval of similar content items in response to search requests. For example, organization module 136a may identify that two images are similar and may group the images together in a cluster. Organization module 136a may process content items to determine clusters independently and/or in conjunction with counterpart organization module (e.g., 140 and/or 136b). In other embodiments, organization module 136a may only provide clusters identified with counterpart organization modules (e.g., 140 and/or 136b) for presentation. Continuing with this example, processing of content items to determine clusters may be an iterative process that may be executed upon receipt of new content items and/or new similarity rules.

In some embodiments, user device 102a may include classification module 150a, while user device 102b may include classification module 150b (collectively 150), which may be used independently, in combination with classification module 152 include on content management system 104, and/or any combination thereof to classify content items, rectify content items, and/or classify images. For example, the classification modules 150 and/or 152 may be used to determine if an image includes a document, and if there so, determine a type of document stored therein. Content item rectification may be performed to correct, perform further transformations, and/or crop content items to improve the display of the content items (e.g., correct the display of a document within an image).

In some embodiments, user device 102a may include search module 142a, while user device 102b may include search module 142b, which collectively may be referred to as search modules 142. Content management system 104 may also be provided with counterpart search module 144. Each of search modules 142 and 144 may be capable of supporting searches for content items located on both user devices 102 and/or content management system 104. A search request may be received by search module 142 and/or 144 that requests one or more content items. In some embodiments, the search may be handled by searching metadata and/or attributes assigned to content items during the provision of management services. For example, cluster markers stored with content items may be used to find content items by date. In this particular scenario, cluster markers may indicate an approximate time, or average time, for the content items stored with the cluster marker, and the marker may be used to speed the search and/or return the search results with the contents of the cluster with particular cluster markers.

Content items 110 managed by content management system 104 may be stored locally within content item system 108 of respective user devices 102 and/or stored remotely within data store 118 of content management system 104 (e.g., content items 134 in data store 118). Content management system 104 may provide synchronization of content items managed thereon. Attributes 112a and 112b (collectively 112) or other metadata may also be stored with content items 110. For example, a particular attribute may be stored with a content item to track content items locally stored on user devices 102 that are managed and/or synchronized by content management system 104. In some embodiments, attributes 112 may be implemented using extended attributes, resource forks, or any other implementation that allows for storing metadata with a content item that is not interpreted by a content item system, such as content item system 108. In particular, attributes 112a and 112b may be content identifiers for content items. For example, the content identifier may be a unique or nearly unique identifier (e.g., number or string) that identifies the content item. By storing a content identifier with the content item, the content item may be tracked. For example, if a user moves the content item to another location within content item system 108 hierarchy and/or modifies the content item, then the content item may still be identified within content item system 108 of user device 102. Any changes or modifications to the content item identified with the content identifier may be uploaded or provided for synchronization and/or version control services provided by content management system 104.

A stand-alone content management application 114a and 114b (collectively 114), client application, and/or third-party application may be implemented on user devices 102a and 102b, respectively, to provide a user interface to a user for interacting with content management system 104. Content management application 114 may expose the functionality provided with content management interface module 154 and accessible modules for user device 102. Web browser 116a and 116b (collectively 116) may be used to display a web page front end for a client application that may provide content management 104 functionality exposed/provided with content management interface module 154.

Content management system 104 may allow a user with an authenticated account to store content, as well as perform management tasks, such as retrieve, modify, browse, synchronize, and/or share content with other accounts. Various embodiments of content management system 104 may have elements including, but not limited to, content management interface module 154, account management module 120, synchronization module 122, collections module 124, sharing module 126, file system abstraction 128, data store 118, and organization module 140. Content management interface module 154 may expose the server-side or back end functionality/capabilities of content management system 104. For example, a counter-part user interface (e.g., stand-alone application, client application, etc.) on user devices 102 may be implemented using content management interface module 154 to allow a user to perform functions offered by modules of content management system 104.

The user interface displayed on user device 102 may be used to create an account for a user and/or authenticate the user to use the account using account management module 120. Account management module 120 may provide the functionality for authenticating use of an account by a user and/or user device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., content item edit history), maximum storage space authorized, storage space used, content storage locations, security settings, personal configuration settings, content sharing data, etc. An amount of storage space on content management system 104 may be reserved, allotted, allocated, stored, and/or may be accessed with an authenticated account. The account may be used to access content items 134 and/or content items 110 within data store 118 for the account, and/or content items 134 and/or content items 110 made accessible to the account that are shared from another account. In some embodiments, account management module 120 may interact with any number of other modules of content management system 104.

An account on content management system 104 may, in some embodiments, be used to store content such as documents, text items, audio items, video items, etc., from one or more user devices 102 authorized by the account. The content may also include collections of various types of content with different behaviors, or other mechanisms of grouping content items together. For example, an account may include a public collection that may be accessible to any user. In some embodiments, the public collection may be assigned a web-accessible address. A link to the web-accessible address may be used to access the contents of the public folder. In another example, an account may include a photos collection that may store photos and/or videos, and may provide specific attributes and actions tailored for photos and/or videos. The account may also include an audio collection that provides the ability to play back audio items and perform other audio related actions. The account may still further include a special purpose collection. An account may also include shared collections or group collections that may be linked with and available to multiple user accounts. In some embodiments, access to a shared collection may differ for different users that may be capable of accessing the shared collection.

Content items 110 and/or content items 134 may be stored in data store 118. Data store 118 may, in some embodiments, be a storage device, multiple storage devices, or a server. Alternatively, data store 118 may be cloud storage provider or network storage accessible via one or more communications networks. Content management system 104 may hide the complexity and details from user devices 102 by using content item system abstraction 128 (e.g., a content item system database abstraction layer) so that user devices 102 do not need to know exactly where the content items are being stored by content management system 104. Embodiments may store the content items in the same collections hierarchy as they appear on user device 102. Alternatively, content management system 104 may store the content items in various orders, arrangements, and/or hierarchies. Content management system 140 may store the content items in a network accessible storage (SAN) device, in a redundant array of inexpensive disks (RAID), etc. Content management system 104 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be store in an object-oriented database, a relational database, a content item system, or any other collection of data. In some embodiments, each content item stored in data store 118 may be assigned a system-wide unique identifier.

Data store 118 may, in some embodiments, decrease the amount of storage space required by identifying duplicate content items or duplicate chunks of content items. Instead of storing multiple copies, data store 118 may store a single copy of content item 134 and then use a pointer or other mechanism to link the duplicates to the single copy. Similarly, data store 118 may store content items 134 more efficiently, as well as provide the ability to undo operations, by using a content item version control that tracks changes to content items, different versions of content items (including diverging version trees), and a change history. The change history may include a set of changes that, when applied to the original content item version, produce the changed content item version.

Content management system 104 may be configured to support automatic synchronization of content from one or more user devices 102. The synchronization may be platform independent. That is, the content may be synchronized across multiple user devices 102 of varying type, capabilities, operating systems, etc. For example, user device 102a may include client software, which synchronizes, via synchronization module 122 at content management system 104, content in content item system 108 of user devices 102 with the content in an associated user account. In some cases, the client software may synchronize any changes to content in a designated collection and its sub-collection, such as new, deleted, modified, copied, or moved content items or folders. In one example of client software that integrates with an existing content management application, a user may manipulate content directly in a local folder, while a background process monitors the local content item for changes and synchronizes those changes to content management system 104. In some embodiments, a background process may identify content that has been updated at content management system 104 and synchronize those changes to the local collection. The client software may provide notifications of synchronization operations, and may provide indications of content statuses directly within the content management application. In some embodiments, user device 102 may not have a network connection available. In this scenario, the client software may monitor the linked collection for content item changes and queue those changes for later synchronization to content management system 104 when a network connection is available. Similarly, a user may manually stop or pause synchronization with content management system 104.

A user may also view or manipulate content via a web interface generated and served by content management interface module 154. For example, the user may navigate in a web browser to a web address provided by content management system 104. Changes or updates to content in data store 118 made through the web interface, such as uploading a new version of a content item, may be propagated back to other user devices 102 associated with the user's account. For example, multiple user devices 102, each with their own client software, may be associated with a single account, and content items in the account may be synchronized between each of user devices 102.

Content management system 104 may include sharing module 126 for managing sharing content and/or collections of content publicly or privately. Sharing module 126 may manage sharing independently or in conjunction with counterpart sharing module 152a, located on user device 102a, and sharing module 152b located on user device 102b (collectively sharing modules 152). Sharing content publicly may include making the content item and/or the collection accessible from any device in network communication with content management system 104. Sharing content privately may include linking a content item and/or a collection in data store 118 with two or more user accounts so that each user account has access to the content item. The sharing may be performed in a platform independent manner. That is, the content may be shared across multiple user devices 102 of varying type, capabilities, operating systems, etc. For example, one or more share links may be provided to a user, or a contact of a user, to access a shared content item. The content may also be shared across varying types of user accounts. In particular, the sharing module 126 may be used with collections module 124 to allow sharing of a virtual collection with another user or user account. A virtual collection may be a collection of content identifiers that may be stored in various locations within content item systems 108 of user device 102 and/or stored remotely at content management system 104.

In some embodiments, the virtual collection for an account with a content management system may correspond to a collection of one or more identifiers for content items (e.g., identifying content items in storage). The virtual collection is created with collections module 124 by selecting from existing content items stored and/or managed by content management system and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item to a directory) the content item in another location within data storage in order to place the content item in the collection.

In some embodiments, content management system 104 may be configured to maintain a content directory or a database table/entity for content items where each entry or row identifies the location of each content item in data store 118. In some embodiments, a unique or a nearly unique content identifier may be stored for each content item stored in data store 118.

In some embodiments, metadata may be stored for each content item. For example, metadata may include a content path that may be used to identify the content item. The content path may include the name of the content item and a content item hierarchy associated with the content item (e.g., the path for storage locally within a user device 102). Content management system 104 may use the content path to present the content items in the appropriate content item hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts.

To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator ("URL"), which allows any web browser to access the content in content management system 104 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be sent to content management system 104 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be sent to content management system 104 which may use the received content identification data to identify the appropriate content entry or database row and return the content item associated with the content entry or database row.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or "false" to indicate that a URL to the content item has not been created. Sharing module 126 may be configured to change the value of the flag to 1 or "true" after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This may allow a user to restrict access to the shared content item without having to move the content item or delete the generated URL. Likewise, sharing module 126 may reactivate the URL by again changing the value of the URL active flag to 1 or true. A user may thus easily restore access to the content item without the need to generate a new URL.

Exemplary Systems

In exemplary embodiments of the present invention, any suitable programming language may be used to implement the routines of particular embodiments including C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time Particular embodiments may be implemented in a computer-readable storage device or non-transitory computer readable medium for use by or in connection with the instruction execution system, apparatus, system, or device. Particular embodiments may be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings/FIGS. may also be implemented in a more separated or integrated manner, or even removed or rendered as inoperable in certain cases, as is useful in accordance with a particular application. It is also within the spirit and scope to implement a program or code that may be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for providing systems and methods for maintain virtual states, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

The invention claimed is:

1. A method comprising:
receiving, at a user device from a user of a digital content management system, a request to share a content item with one or more additional users;
in response to receiving the request to share the content item, sending, to the digital content management system, a request for a global ID for a shared virtual space accessible to the user and the one or more additional users;
prior to receiving the requested global ID:
assigning, to the content item, a local ID associated with a local virtual space corresponding with the shared virtual space;
allocating a portion of memory on the user device for the requested global ID; and
providing, for display on the user device, a representation of the local virtual space that comprises the content item;
receiving, from the digital content management system, the global ID for the shared virtual space; and
storing the received global ID in the allocated portion of memory of the user device.

2. The method of claim 1, wherein allocating the portion of memory on the user device for the requested global ID comprises setting up a data structure on the client device for storing the local ID and the global ID.

3. The method of claim 2, wherein setting up the data structure comprises creating one or more of a lookup table, a translation table, or a database.

4. The method of claim 2, further comprising, prior to receiving the global ID, referencing one or more digital content items added to the local virtual space with the local ID.

5. The method of claim 4, wherein referencing the one or more digital content items with the local ID comprises adding one or more instances of the local ID to the data structure on the client device, wherein the one or more instances of the local ID correspond respectively to the one or more digital content items added to the virtual space.

6. The method of claim 5, wherein allocating the portion of memory on the user device for the requested global ID comprises allocating one or more portions of the data structure for the requested global ID based on the one or more instances of the local ID.

7. The method of claim 1, wherein allocating the portion of memory on the user device for the requested global ID comprises reserving a portion of an existing data structure on the client device for storing the local ID and the global ID.

8. The method of claim 7, wherein the existing data structure comprises one or more additional instances of the local ID associated with one or more digital content items added to the local virtual space prior to receiving the global ID from the digital content management system.

9. The method of claim 1, further comprising:
receiving an additional request to share an additional content item with the one or more additional users; and
prior to receiving the requested global ID, updating the representation of the local virtual space to include the additional content item.

10. The method of claim 1, further comprising creating the local ID, wherein sending the request for the global ID and creating the local ID are performed simultaneously in response to receiving the request to share the content item with the one or more additional users.

11. The method of claim 1, wherein the request to share the content item with the one or more additional users comprises a request to add the content item to the shared virtual space accessible to the user and the one or more additional users.

12. The method of claim 1, further comprising:
detecting a connectivity between the user device and the digital content management system;
determining that the connectivity is below a threshold connectivity; and
wherein assigning the local ID associated with the local virtual space is in response to determining that the connectivity is below the threshold connectivity.

13. The method of claim 1, further comprising replacing the local ID with the global ID following receipt of the global ID.

14. The method of claim 1, wherein providing the representation of the local virtual space that comprises the content item comprises simulating a representation of the shared virtual space prior to a creation of the shared virtual space.

15. The method of claim 1, further comprising, in response to receiving the global ID for the shared virtual space, replacing the local ID with the global ID.

16. The method of claim 1, wherein replacing the local ID with the global ID comprises replacing the local ID with the global ID in the portion of memory on the user device allocated for the requested global ID without alternating the displayed representation of the local virtual space that comprises the content item.

17. A non-transitory computer readable medium containing instructions that, when executed by at least one processor of a user device, cause the user device to:
receive, at a user device from a user of a digital content management system, a request to share a content item with one or more additional users;
in response to receiving the request to share the content item, send, to the digital content management system, a request for a global ID for a shared virtual space accessible to the user and the one or more additional users;
prior to receiving the requested global ID:
assign, to the content item, a local ID associated with a local virtual space corresponding with the shared virtual space;
allocate a portion of memory on the user device for the requested global ID; and
provide, for display on the user device, a representation of the local virtual space that comprises the content item;
receive, from the digital content management system, the global ID for the shared virtual space; and
store the received global ID in the allocated portion of memory of the user device associated with the local ID.

18. The non-transitory computer readable medium of claim 17, wherein allocating the portion of memory on the device comprises one of:
setting up a data structure on the client device for storing the local ID and the global ID; or
reserving space of an existing data structure on the client device for storing the local ID and the global ID.

19. A system comprising:
at least one processor; and a non-transitory computer-readable storage medium storing instructions thereon that, when executed by the at least one processor, cause the system to:
receive, at a user device from a user of a digital content management system, a request to share a content item with one or more additional users;
in response to receiving the request to share the content item, send, to the digital content management system, a request for a global ID for a shared virtual space accessible to the user and the one or more additional users;
prior to receiving the requested global ID:
assign, to the content item, a local ID associated with a local virtual space corresponding with the shared virtual space;
allocate a portion of memory on the user device for the requested global ID; and
provide, for display on the user device, a representation of the local virtual space that comprises the content item;
receive, from the digital content management system, the global ID for the shared virtual space; and
store the received global ID in the allocated portion of memory of the user device associated with the local ID.

20. The system of claim 19, wherein allocating the portion of memory on the user device comprises one of:
setting up a data structure on the client device for storing the local ID and the global ID; or
reserving space of an existing data structure on the client device for storing the local ID and the global ID.

* * * * *